E. W. BURGESS.
CLUTCH MECHANISM FOR CORN PLANTERS.
APPLICATION FILED APR. 30, 1914.
1,176,130.
Patented Mar. 21, 1916.
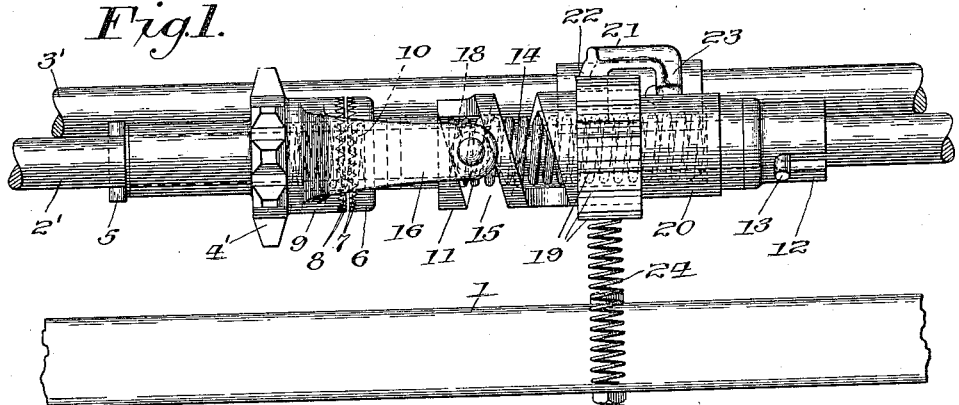
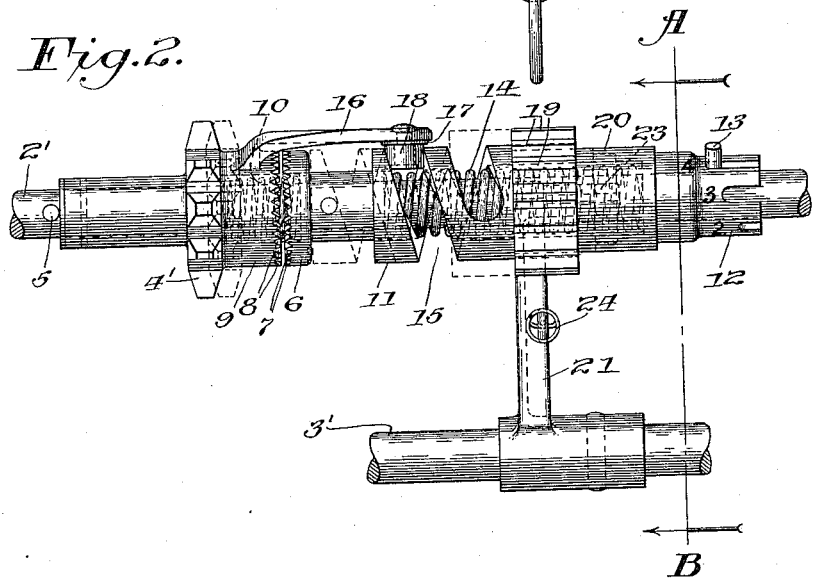
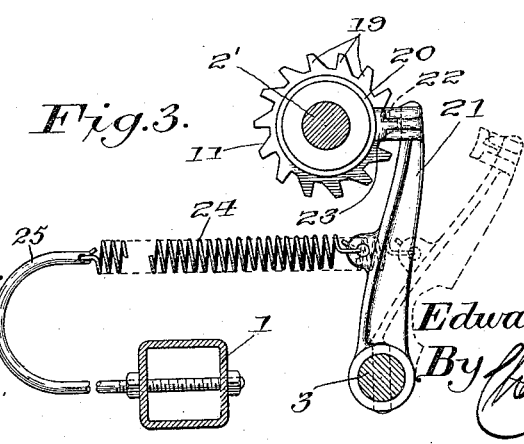
Witnesses:
C. C. Palmer.
F. W. Hoffmeister.
Inventor:
Edward W. Burgess,
By Chas. E. Lord
Atty.

UNITED STATES PATENT OFFICE.

EDWARD W. BURGESS, OF CHICAGO, ILLINOIS, ASSIGNOR TO INTERNATIONAL HARVESTER CORPORATION, A CORPORATION OF NEW JERSEY.

CLUTCH MECHANISM FOR CORN-PLANTERS.

1,176,130.  Specification of Letters Patent.  Patented Mar. 21, 1916.

Application filed April 30, 1914. Serial No. 835,369.

*To all whom it may concern:*

Be it known that I, EDWARD W. BURGESS, a citizen of the United States, residing at Chicago, in the county of Cook and State of Illinois, have invented certain new and useful Improvements in Clutch Mechanism for Corn-Planters, of which the following is a full, clear, and exact specification.

My invention relates to corn planters, and in particular to an improved form of clutch mechanism forming part of the associated mechanical elements that are operative to control the seed dropping mechanism in a variable manner at the will of the operator, and consists in an intermittently operating clutch mechanism connected with the feed shaft of a planter in a manner to transmit rotary movement thereto through its operative connection with the driving mechanism when tripped into action automatically, as by the check wire operative in a common way, or by manually operative means when controlled by the operator, and to means connected with the clutch tripping mechanism and operative to vary the degree of angular movement of the feed shaft whereby a variable number of kernels of corn may be dropped by the seed delivering mechanism connected with the feed shaft.

The object of the invention is to provide a clutch mechanism for the purpose indicated that will be positive in its operation, comprising few parts, simple and cheaply constructed, and efficient and durable in operation. These objects are attained by means of mechanism, one embodiment of which is illustrated in the accompanying drawing, in which—

Figure 1 is a top plan view of part of a corn planter sufficient to illustrate an embodiment of my invention; Fig. 2 is a partial end elevation of part of Fig. 1; and Fig. 3 is a cross section of Fig. 2 along line A—B, and in the direction of the arrows.

Referring to the drawings, wherein the same reference characters designate like parts throughout the several views, 1 represents a transverse member of the runner frame structure of a corn planter, $2^1$ the seed or feed shaft, and $3^1$ the clutch tripping and valve operating shaft that may be rocked at stated intervals by the tappets upon the check wire in a well-known way.

$4^1$ represents a constantly rotatable sprocket wheel that may be operatively connected with the driving mechanism of a planter. The sprocket wheel is journaled upon the feed shaft $2^1$ and is permitted a longitudinal movement thereon in opposite directions between a pin 5 and a flange collar 6 secured to the feed shaft. The face of the flanged collar is provided with radially disposed clutch teeth 7 that are adapted to engage with like clutch teeth 8 upon the adjacent end of the counterbore part 9 of the sprocket wheel 4, the sprocket wheel 4 being normally disengaged from the flanged collar 6 by means of the expansive force of a spring 10 carried by the feed shaft $2^1$ operative within the counterbore and against the part 6. Rotatably mounted upon the clutch collar 6 is one end of a reciprocating clutch governing sleeve 11, its opposite end being reduced in diameter and journaled upon the feed shaft $2^1$, and 12 represents an adjustable thimble carried by the feed shaft and controlled by a pin 13, the thimble being operative to regulate the extent of the longitudinal movement of the reciprocating clutch governing sleeve in one direction, and 14 represents a compression spring carried by the feed shaft within the sleeve and operative between the clutch collar 6 and the end wall of the sleeve in a manner to normally hold the sleeve in contact with the thimble 12. The clutch governing sleeve 11, at the end journaled upon the clutch collar 6, is provided with a spirally disposed channel 15, preferably having a lead of one inch in the direction of the rotation of the sleeve and toward its opposite end, and 16 represents a longitudinally disposed arm integral with the sprocket wheel $4^1$ and parallel with the feed shaft $2^1$, the arm being provided at its free end with an inwardly extending radially disposed stud 17, upon which is journaled a roller 18 that is operatively received by the spirally disposed channel 15. The clutch governing sleeve is also provided upon its periphery, adjacent the end of the channel 15, with a series of teeth 19 disposed parallel with the axis of the feed shaft $2^1$ and terminating at a reduced cylindrical part 20 of the sleeve.

21 represents a clutch tripping arm secured to the clutch tripping shaft $3^1$ and provided at its free end with a pawl member 22 that is adapted to engage with the teeth 19, and a laterally turned stop wing 23 that engages with the cylindrical part 20 of the sleeve in a manner to limit the extent of engagement of the pawl member 22 with the teeth as normally controlled by a tension spring 24, having one end connected with the pawl and its opposite end with a longitudinally adjustable member 25 carried by the runner frame member 1 of the planter.

In operation the sprocket wheel $4^1$ rotates freely upon the feed shaft $2^1$, the clutch governing sleeve 11 being held in the position shown by dotted lines in Fig. 2, with the pawl member 22 of the tripping arm 21 engaged with the ends of the teeth 19 and the shoulder between the reduced portion 20 and the teeth in a manner to retain the sleeve against a longitudinal movement through the expansive force of the spring 14 and permit it to rotate with the sprocket wheel and its arm 16, the clutch teeth 7 and 8 being disengaged by the expansive force of the spring 10. When the clutch tripping shaft $3^1$ is rocked by a check wire or otherwise in a direction away from the axis of the feed shaft, it carries the free end of the clutch tripping arm 21 and its pawl member 22 away from engagement with the clutch governing sleeve 11 and the expansive force of the spring 14 immediately moves the sleeve longitudinally and rotatably against the thimble 12, as shown by full lines in Fig. 2, and when the shaft $3^1$ is released from the controlling check wire the spring 24, through its connection with the tripping arm, rocks the shaft in an opposite direction and carries the pawl member 22 into engagement with the teeth 19 and suspends the rotative movement of the sleeve 11, the wing 23 resting upon the part 20 of the sleeve. When the rotative movement of the sleeve is arrested the arm 16 will first draw the sprocket wheel $4^1$ into engagement with the fixed clutch member 6, the expansive force of the spring 14 being sufficiently greater than that of the spring 10 to compel such engagement; then the arm will draw the sleeve 11 toward the sprocket wheel as the roller 18 traverses the channel 15 and follows its lead. The sleeve will be drawn in that direction until the teeth 19 have passed beyond the pawl member 22 and the cylindrical part 20 beyond the wing 23, when the arm 21 will swing toward the axis of the feed shaft under the force of the spring 24 and the pawl member 22 will engage the shoulder between the reduced portion 20 and the teeth 19 and the wing 23 with the opposite end of the reduced portion in a manner to retain the sleeve against longitudinal movement and permit a rotative movement thereof transmitted through the arm 16; the sprocket wheel $4^1$ being disengaged from the fixed clutch member 6 simultaneously with the release of the pawl member 22 from the teeth, and the rotative movement of the feed shaft $2^1$ ceases, the degree of angular movement of the feed shaft being determined by the rotative movement of the sprocket wheel $4^1$ while in engagement with the fixed clutch member 6, and the engagement of such parts of the clutch mechanism determined by the extent of longitudinal movement of the clutch governing sleeve 11, and such movement of the sleeve is determined by the position of adjustment of the thimble 12 relative to the pin 13, the thimble being provided with a series of open ended slots designated by the index numbers 2, 3 and 4. When the thimble is adjusted with the pin received by the slot 4, the parts will be in the position as shown by full lines in Figs. 1 and 2, and it will require one complete revolution of the sprocket wheel $4^1$ to draw the sleeve 11 far enough to permit the pawl 22 to be disengaged from the teeth 19. The slot 3 is stepped $\frac{1}{4}$ of an inch shorter than 4, and if the thimble be adjusted with the pin in slot 3, it will require $\frac{3}{4}$ of a revolution of the sprocket wheel to draw the sleeve to the same point. The slot 2 is stepped $\frac{1}{2}$ of an inch shorter than 4, and if the pin is received thereby it will require $\frac{1}{2}$ of a revolution of the sprocket wheel to draw the sleeve to the same point, and the feed shaft $2^1$ is given an angular movement of substantially the same degree as is required by the sprocket wheel to draw the sleeve to the point indicated, which may be either a complete $\frac{3}{4}$ or $\frac{1}{2}$ of a revolution. It is usual in planters to provide seed plates having sixteen receiving cells and to turn the plate through $\frac{1}{4}$ of a revolution to carry four kernels to the seed outlet, such angular movement of the plate requiring one complete revolution of the feed shaft with which it is operatively connected. In this invention by adjusting the thimble 12 of the mechanism as shown, the seed dropping mechanism may be controlled in a variable manner to deliver two, three, or four kernels as desired.

Having shown and described a preferred embodiment of my invention, I do not wish that it be confined closely to the precise details of construction, as many changes may be made in the form, assemblage and proportion of its parts without departing from the spirit of my invention.

What I claim as my invention, and desire to secure by Letters Patent, is:

1. In a seed planter, a feed shaft, a single clutch mechanism comprising means for imparting a whole or a part of its revolution thereto, and a single trip arm for controlling said clutch mechanism.

2. In a seed planter, a feed shaft, a driving member thereon, a driven member thereon, and governing means carried on said shaft at one side of said driving and driven members for connecting the two during a whole or part of a revolution.

3. In a seed planter, the combination of a feed shaft, a constantly rotating member adapted to be connected therewith, governing means for intermittently connecting said constantly rotating member with the feed shaft for a whole or a part of a revolution, and a single trip arm for controlling said governing means.

4. In a seed planter, the combination of a feed shaft, a clutch member thereon laterally shiftable and capable of engagement therewith for variable periods, and a single arm normally engaging with said clutch member for holding it disengaged and adapted to be released intermittently to permit said clutch member to engage.

5. In a seed planter, the combination of a seed shaft, clutch members thereon, governing means having a rotative and reciprocal movement and capable of causing engagement of said clutch members during its reciprocal movement and disengagement during its rotative movement, and a single arm for alternately suspending both of said movements.

6. In a clutch mechanism for planters, an intermittently rotatable shaft, a constantly rotatable clutch member journaled upon said shaft and permitted longitudinal movement thereon, a second clutch member secured to said shaft and adapted to coact with said constantly rotatable clutch member to transmit motion to said shaft, a rotary reciprocating clutch governing member journaled upon said shaft, and a clutch tripping pawl controlling the action of said clutch governing member.

7. In a clutch mechanism for planters, an intermittently rotatable shaft, a constantly rotatable clutch member journaled upon said shaft and permitted longitudinal movement thereon, a second clutch member secured to said shaft and adapted to coact with said constantly rotatable clutch member to transmit motion to said shaft, a reciprocating clutch governing member journaled upon said shaft, means carried by said constantly rotatable clutch member operative to move said clutch governing member toward said constantly rotatable clutch member, and a clutch tripping pawl coacting with said means in a manner to control the action of said clutch governing member.

8. In a clutch mechanism for planters, an intermittently rotatable shaft, a constantly rotatable clutch member journaled upon said shaft and permitted longitudinal movement thereon, a second clutch member secured to said shaft and adapted to coact with said constantly rotatable clutch member to transmit motion to said shaft, a reciprocating clutch governing member journaled upon said shaft, means carried by said constantly rotatable clutch member operative to move said clutch governing member toward said constantly rotatable clutch member, a compression spring operative to move said clutch governing member in an opposite direction, and a clutch tripping pawl coacting with said means in a manner to control the action of said clutch governing member.

9. In a clutch mechanism for planters, an intermittently rotatable feed shaft, a constantly rotatable clutch member journaled upon said shaft and permitted a limited longitudinal movement thereon, a clutch member secured to said shaft and adapted to engage with said constantly rotatable clutch member, a spring operative to normally disengage said clutch members, a reciprocating clutch governing member journaled upon said shaft, and means carried by said constantly rotatable clutch member and engaging with said clutch governing member in a manner to carry said clutch members into engagement.

10. In a clutch mechanism for planters, an intermittently rotatable feed shaft, a constantly rotatable clutch member journaled upon said shaft and permitted a limited longitudinal movement thereon, a clutch member secured to said shaft and adapted to engage with said constantly rotatable clutch member, a spring operative to disengage said clutch members, a reciprocating clutch governing member journaled upon said shaft and provided with a spirally disposed channel leading axially thereof, and an arm carried by said constantly rotatable clutch member and engaging with said channel in a manner to carry said clutch members into engagement.

11. In a clutch mechanism for planters, an intermittently rotatable feed shaft, a constantly rotatable clutch member journaled upon said shaft and permitted a limited longitudinal movement thereon, a clutch member secured to said shaft and adapted to engage with said constantly rotatable clutch member, a spring operative to disengage said clutch members, a reciprocating clutch governing member journaled upon said feed shaft and provided with a spirally disposed channel leading axially thereof, an arm carried by said constantly rotatable clutch member and engaging with said channel in a manner to draw said clutch governing member toward said constantly rotatable clutch member, and a spring operative to move it in an opposite direction.

12. In a clutch mechanism for planters, an intermittently rotatable feed shaft, a constantly rotatable clutch member journaled upon said shaft and permitted a limited longitudinal movement thereon, a clutch member secured to said shaft and adapted to engage with said constantly rotatable clutch member, a spring operative to disengage said clutch members, a reciprocating clutch governing member journaled upon said feed shaft and provided with a spirally disposed channel leading axially thereof, an arm carried by said constantly rotatable clutch member and engaging with said channel in a manner to draw said clutch governing member toward said constantly rotatable clutch member, a clutch tripping rock shaft, and a pawl carrying arm secured to said rock shaft and controlling the movement of said clutch governing mechanism.

13. In a clutch mechanism for planters, an intermittently rotatable feed shaft, a constantly rotatable clutch member journaled upon said shaft and permitted a limited longitudinal movement thereon, a clutch member secured to said shaft and adapted to engage with said constantly rotatable clutch member, a spring operative to disengage said clutch members, a reciprocating clutch governing cylindrical toothed shell journaled upon said feed shaft and provided with a spirally disposed channel leading axially thereof, an arm carried by said constantly rotatable clutch member and engaging with said channel in a manner to draw said shell toward said constantly rotatable clutch member, a spring operative to move said shell in an opposite direction, a clutch tripping rock shaft, and a pawl arm secured to said shaft and adapted to periodically engage the teeth upon said shell.

14. In a clutch mechanism for planters, an intermittently rotatable feed shaft, a constantly rotatable clutch member journaled upon said shaft and permitted a limited longitudinal movement thereon, a clutch member secured to said shaft and adapted to engage with said constantly rotatable clutch member, a spring operative to disengage said clutch members, a reciprocating clutch governing cylindrical shell journaled upon said feed shaft and provided with a spirally disposed channel leading axially thereof, an arm carried by said constantly rotatable clutch member and engaging with said channel in a manner to draw said shell toward said constantly rotatable clutch member, a spring operative to move said shell in an opposite direction, and means for varying the extent of a reciprocating movement of said shell.

15. In a clutch mechanism for planters, an intermittently rotatable feed shaft, a constantly rotatable clutch member journaled upon said shaft and permitted a limited longitudinal movement thereon, a clutch member secured to said shaft and adapted to engage with said constantly rotatable clutch member, a spring operative to disengage said clutch members, a reciprocating clutch governing cylindrical shell journaled upon said feed shaft and provided with a spirally disposed channel leading axially thereof, an arm carried by said constantly rotatable clutch member and engaging with said channel in a manner to draw said shell toward said constantly rotatable clutch member, a spring operative to move said shell in an opposite direction, and a thimble carried by said feed shaft and adjustable longitudinally thereon in a manner to regulate the extent of a reciprocating movement of said shell.

16. In a clutch mechanism for planters, an intermittently rotatable feed shaft, a constantly rotatable clutch member journaled upon said shaft and permitted a limited longitudinal movement thereon, a second clutch member secured to said shaft and adapted to engage with said constantly rotatable clutch member at predetermined intervals to transmit motion to said shaft, a reciprocating rotatable clutch governing member journaled upon said shaft, and a clutch tripping pawl controlling the rotation and reciprocating movement of said clutch governing member.

17. In a clutch mechanism for planters, an intermittently rotatable shaft, a constantly rotatable clutch member journaled upon said shaft, a second clutch member secured to said shaft and adapted to coact with said constantly rotatable clutch member to transmit motion to said shaft at predetermined intervals, a reciprocating rotatable clutch governing cylindrical shell journaled upon said shaft and actuated by said constantly rotatable clutch member, said shell being provided with teeth upon its periphery, a tripping rock shaft, a pawl carrying arm secured to said rock shaft and adapted to engage said teeth at predetermined intervals in a manner to suspend a rotary movement and permit a longitudinal movement thereof, said pawl locking said reciprocating member against a longitudinal movement when said reciprocating member has traveled a predetermined distance.

In testimony whereof I affix my signature, in the presence of two witnesses.

EDWARD W. BURGESS.

Witnesses:
CLYDE C. PALMER,
WILLIAM ELLIS.

Copies of this patent may be obtained for five cents each, by addressing the "Commissioner of Patents, Washington, D. C."